June 6, 1967      A. H. VORNE      3,324,367
POWER SUPPLY FOR AN A.C. MOTOR
Filed Sept. 11, 1963      2 Sheets-Sheet 1
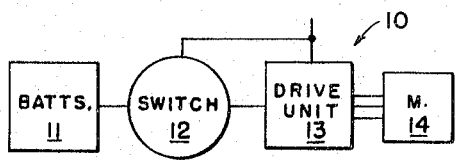
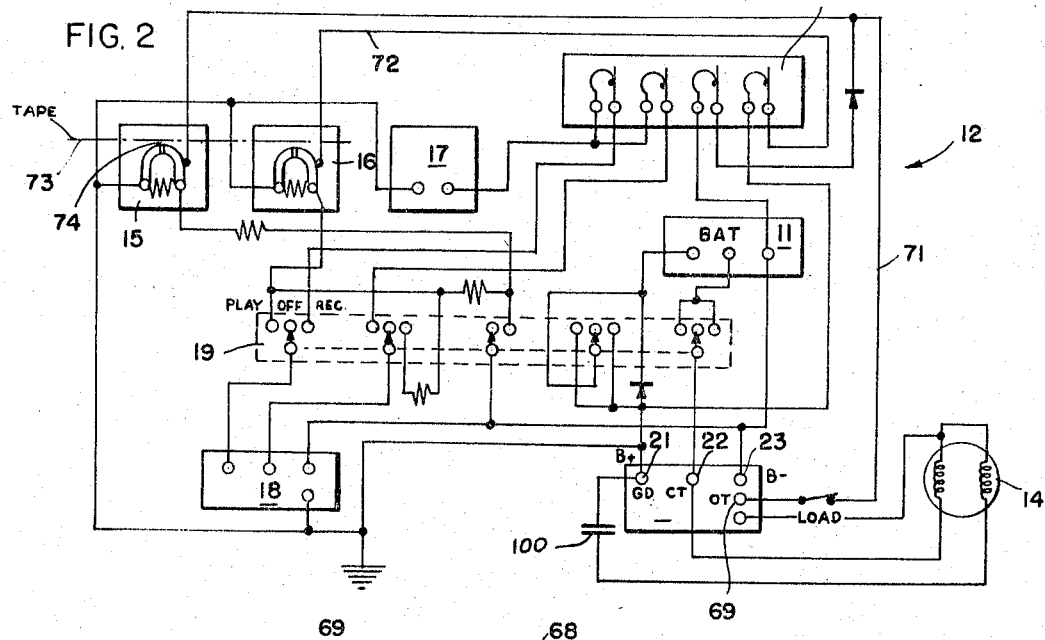
INVENTOR:
ALFRED H. VORNE
BY
Watson D. Harbaugh
ATT'Y June 6, 1967  A. H. VORNE  3,324,367
POWER SUPPLY FOR AN A.C. MOTOR
Filed Sept. 11, 1963  2 Sheets-Sheet 2
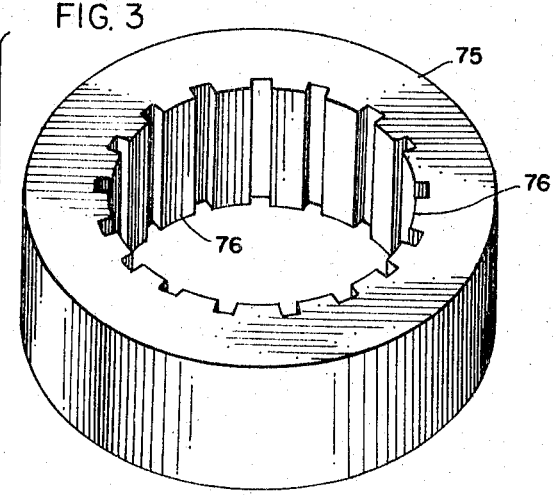
FIG. 3
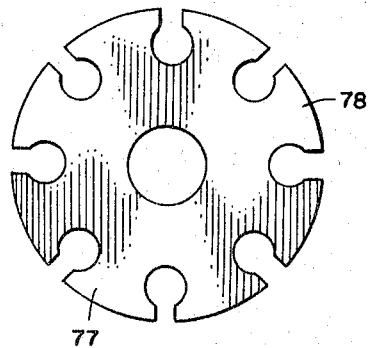
FIG. 4
FIG. 7
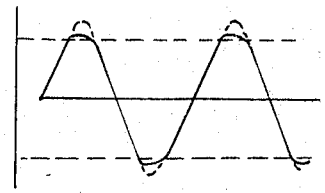
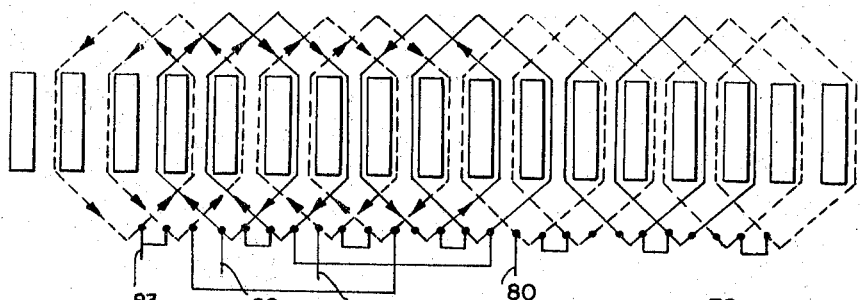
FIG. 5
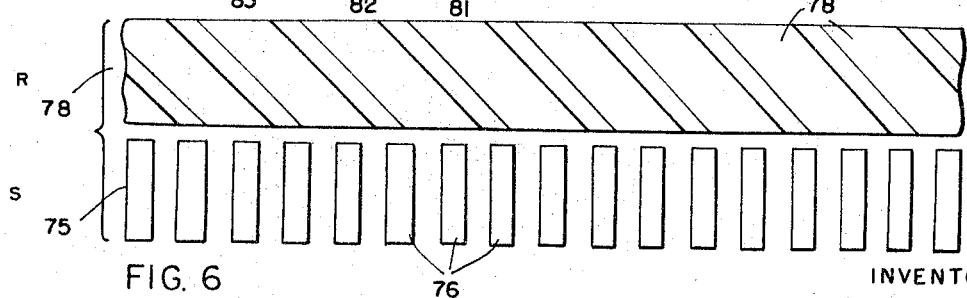
FIG. 6
INVENTOR:
ALFRED H. VORNE
BY:
ATT'Y United States Patent Office 3,324,367
Patented June 6, 1967

3,324,367
POWER SUPPLY FOR AN A.C. MOTOR
Alfred H. Vorne, Chicago, Ill., assignor to Webcor, Inc.,
Chicago, Ill., a corporation of Illinois
Filed Sept. 11, 1963, Ser. No. 308,242
6 Claims. (Cl. 318—138)

This invention relates to electric motor constructions generally, and more particularly to an improved power and speed control for small electrical drive motors.

Recent trends toward the miniaturization of electrically driven tape recorders, phonographs, and similar appliances, have given rise to a demand for miniaturized electrical motors and motor speed control systems which are capable of operating efficiently to provide peak driving power with minimum fluctuation while occupying a minimal space. It is necessary that such miniaturized motor and motor control systems fulfill additional requirements when employed as a driving means for apparatus such as small magnetic tape recording units, for in such units, the recording tape must be driven past the play-record heads with no speed or pitch variation. Therefore the miniature prime mover employed should ideally develop maximum output power while providing a smooth drive with no power and speed fluctuation.

The present invention provides a novel, efficient, high output RC drive oscillator power and speed control circuit along with a self-starting, smooth running, improved AC unit which is not subject to the inefficient operation normally attendant with RC oscillator driven motors and flea power motors.

It is therefore a primary object of this invention to provide an improved oscillator control circuit for driving A.C. electric motors at constant speed.

Another object of this invention is to provide an improved RC phase shift oscillator control circuit for driving small A.C. electric motors with higher efficiency and without incurring a loss below input power potential in the phase shift system.

A further object of this invention is to provide an improved RC phase shift oscillator control circuit for driving small A.C. electric motors which is capable of developing a peak-to-peak motor drive voltage equal to the D.C. input supply voltage minus emitter-to-collector saturation voltage of final stage transistors.

Another object of this invention is to provide an improved RC phase shift oscillator control circuit for driving small A.C. electric motors which is capable of developing maximum A.C. motor power from a battery source.

A still further object of this invention is to provide an improved miniaturized A.C. motor and motor control system capable of providing optimum smooth, constant speed mechanical driving power for a compact electrical unit.

With the foregoing and other objects in view, the invention resides in the following specification and appended claims, certain embodiments and details of construction of which are illustrated in the accompanying drawings in which:

FIG. 1 is a block diagram of the electric motor drive and control circuit of the present invention;

FIG. 2 is a circuit diagram of the switching section of the electric motor drive and control circuit of the present invention;

FIG. 2A is a circuit diagram of the RC phase shift oscillator driving section of the electric motor control circuit of the present invention;

FIG. 3 is an exploded perspective view of the stator and rotor portions of the electric motor with improved component arrangements;

FIG. 4 is a plan view of the rotor of FIG. 3;

FIGS. 5 and 6 are diagrammatic representations illustrating the physical and magnetic alignment of the stator and rotor units of FIG. 3; and FIG. 7 illustrates an output wave form produced by the electric motor drive circuit of FIG. 2A.

The miniaturized electric motor and electric motor drive and control circuitry of the present invention may be advantageously employed as the driving unit for a compact tape recorder, for this driving unit is capable of providing the necessary smooth, uninterrupted driving power for a magnetic tape which is required if clear reproduction of taped material including music is to be achieved. Although the electric motor and electric motor control and drive circuitry of this invention are illustrated in conjunction with tape recorder components and circuitry, it is obvious that this invention may be employed as a driving component for other electrical units, and is in no way limited to tape recorders.

Referring now to FIG. 1, the novel electric motor and electric motor control drive circuit of the present invention, indicated generally at 10, basically include a battery or power supply 11, a switching control unit 12, a phase shift motor drive circuit 13, and an A.C. electric motor 14.

In FIG. 2, the switching circuit 12 is illustrated as constituting the switching control circuit of a compact tape recorder unit. However, the switching control circuit 12 could comprise any desired switching unit which may be suitable to attain a desired control function.

Referring now to FIG. 2, it will be noted that the switching circuit 12 receives power from the battery unit 11. This battery power is selectively supplied to the motor drive circuit 13 and the tape recorder record head 15, play back head 16, microphone 17, and amplifier 18 under the control of a manual gang switching unit 19 and an automatic relay jack 20.

When the manual switching unit 19 is switched to either of its active positions, for example the "play" or "record" positions in FIG. 2, the battery 11 is connected across the terminals 21, 22 and 23 of the electric motor drive circuit 13, and a signal is thereby furnished to energize the electric motor 14.

The electric motor drive circuit 13 of FIG. 2A comprises a RC phase shift oscillator which operates to furnish a high efficiency, two phase power signal or supply to the A.C. motor 14. Unlike the inefficient RC phase shift oscillator drive circuits previously employed as driving units for small A.C. motors, drive circuit 13 of the present invention provides a quasi sine wave driving signal to the motor 14 which has a peak-to-peak voltage value equal essentially to the voltage output of battery 11. Additionally, this quasi sine wave signal incorporates a higher r.m.s. value than a sine wave of the same amplitude, and therefore provides from 5 to 10% more effective power than is attainable from the normal sine wave of equal magnitude. Moreover, the phase of the resulting wave can be shifted by capacitor 100. Even though a square wave might produce even more effective power it cannot be shifted to run a brushless motor.

The RC phase shift oscillator drive unit 13 comprises a push-pull amplifier stage 43 and a driver stage 24 which includes a transistor 25 having a base electrode 26, an emitter electrode 27 and a collector electrode 28. The base electrode 26 is connected to a three stage. RC phase shift network 29 which operates to provide 180° phase shift of the feedback signal at the desired operating frequency. This RC phase shift network includes three series capacitors 30, 31 and 32 shunted by resistors 33, 34, 35, 36 and 37.

The design frequency of oscillation of the oscillator is determined by the resistance and capacitance value of the individual components forming the phase shift network 29, and shunt resistor 33 is made variable to permit the variation of such oscillator frequency. Also, shunt resistor 35 is a temperature compensating resistor which varies with temperature to maintain a steady oscillation frequency.

The transistor 25 of the driver stage 24 receives battery power from the terminal 21 across an input network 38 which includes a resistor 39 electrically connected to the emitter electrode 27. Resistor 39 is shunted by a shunt capacitor 40.

The oscillation output signal from the transistor 25 is developed across a collector capacitor 41 and a resistor 42, and such signal is then fed to a push-pull amplifier stage 43. The oscillator output signal at the collector 28 of the transistor 25 is isolated from the base 26 by resistors 44 and 45.

It must be noted that the output signal from the transistor 25 is not fed back directly from the collector electrode 28 to the phase shift network 29 as is normally the case in conventional RC phase shift oscillators, but conversely, the feedback signal is taken from the collector electrodes 60 and 61 of the push-pull amplifier stage 43 so that the windings of motor 14 whose reactive impedance is a function of motor speed are included in the feedback circuit to cause the frequency of oscillations of the drive circuit to change in inverse relation to the motor speed so that the speed tends to remain constant. Thus as the speed derceases, the reactive impedance of the windings decreases and this in turn causes the oscillation frequency of the circuit to increase to return the motor speed to normal.

The push-pull amplifying system 43 may be formed from any well known amplifying system capable of providing an output signal from either a first or a second amplifying network in accordance with the polarity of an input signal to the system. Amplifying system 43 includes a transistor 46 and a transistor 47 which have base electrodes 48 and 49 commonly connected to the resistor 42 to receive the output signal from the driven stage 24. This signal is also connected to the terminal 22 by means of a shunt resistor-capacitor combination 50 and to commonly connected emitter electrodes 51 and 52 of the transistors 46 and 47 by a resistor 53.

Transistor 46 includes a collector electrode 54 which is positively biased from terminal 21 by means of a collector resistor 55, while transistor 47 includes a collector electrode 56 which is negatively biased from terminal 23 by means of a collector resistor 57. Terminal 22 is the D.C. level at the center top of the battery and therefore has no signal associated with it.

The transistor amplifier 43 includes a second stage composed of transistors 58 and 59 having commonly connected collector electrodes 60 and 61. Transistor 58 includes an emitter electrode 62 which is connected to terminal 23 and a base electrode 63 which is connected to the collector electrode 56 of the transistor 47, and transistor 59 includes an emitter electrode 64 which is connected to terminal 21 and a base electrode 65 which is connected to the collector electrode 54 of the transistor 46.

The amplifier 43 operates in the well known fashion of push-pull amplifiers to provide an amplified output signal at the collector 61 of the transistor 58 during one half cycle of the output signal from the oscillator 24 and an amplified signal at the collector 60 of the transistor 59 during the remaining half cycle of such oscillator output signal. These amplified signals from the amplifier 43 are caused to build up a voltage in an output capacitor 66 which is connected across the emitter-collector terminals of the transistor 59. The voltage signal developed in the capacitor 66 is fed by means of an output line 67 to a load, which constitutes the motor 14 of FIG. 2. Additionally, the signal on the output line 67 is fed back by means of a feedback line 68 to the phase shifting circuit 29 so that changes in motor speed cause the oscillator frequency of the driver circuit 13 to change to correct for speed deviations.

In the operation of the motor drive circuit 13 of FIG. 2A, the provision of power to the circuit causes the circuit to operate in the manner commonly attributable to transistorized RC phase shift oscillators. However, in this system the output signal is not developed at the collector 28 of the transistor 25 and directly fed back to the phase shift system 29, as is commonly the case in RC phase shift oscillators, but instead, such output signal is first fed to the push-pull amplifier 43. The amplified signal from the amplifier 43 is then fed back as a negative feedback signal over the feedback loop 68 to the phase shift system 29 where it is inverted and furnished to the base 26 of the transistor 25; thereby causing the system to oscillate.

The output signal of the circuit shown in FIGURE 7. Although output harmonics are created by reason of the saturation of the amplifiers, these harmonics are high in frequency and have little effect on the motor 14, are negligible in amount, and are only odd harmonics which cause the least distortion. Therefore, the motor 14 is driven by an A.C. signal which has a peak-to-peak voltage equal to maximum battery voltage and which incorporates a high power factor. Through the use of the motor drive system 13, the motor 14 may be driven by the same battery power employed with previous systems at greater efficiency. A particularly excellent relationship is found with 150 cycles per second for driving a motor theoretically at the speed of 9000 r.p.m.

When the motor drive system 13 of FIG. 2A is employed in a tape recorder, a terminal 69 may be provided to facilitate electrical connection between a conductor 70 in the motor drive system and a conductor 71 in the switching system of FIG. 2. Conductor 70 is connected to the base 26 of the transistor 25 in the oscillator system 24, while conductor 71 is connected to a terminal connection on the tape recording head 15. A second conductor 72 is connected to a terminal on the second head 16 of the tape recorder and completes a circuit through the relay switching unit 20 and the manual switching unit 19 to the battery 11 when the manual switching unit is placed on the "play" position. A special recording tape 73 having an electrical conductive coating or conductive section 74 at one end thereof may then be fed across the recorder heads 15 and 16. When the tape reaches the extremity which includes the conductive section 74, the conductive section bridges the heads 15 and 16 causing a signal to be fed from the battery 11 via the conductor 72 to the conductor 71, the terminal 69, and the conductor 70 to the base 26 of the transistor 25. This signal biases the transistor 25 to the non-conductive state, thereby automatically removing the drive signal from the electric motor 14.

FIGS. 3–6 illustrate the component arrangement and construction of the miniaturized two phase A.C. drive motor 14 which is employed in combination with the motor drive circuit of FIG. 2A. The motor 14 includes a stator 75 having a plurality of stator poles 76 which cooperate with the poles 77 of a laminated rotor 78 (FIGS. 3 and 4).

Rotor 78 is a standard two phase, double skew rotor. The skew 79 of the rotor 78 leads in the direction of relative rotation at a common end of the rotor and stator, so that viewed laterally of the axis of the motor 14, the poles 76 and 78 of the rotor and stator cross at their mutual air gap. The relationship between the rotor and stator poles of the motor 14 is illustrated by the diagrammatic representation of FIG. 6, while the diagrammatic representation of FIG. 5 illustrates the field structure of the two phase stator 75.

Referring to FIG. 5, the two phase stator field illustrated is provided with four stator leads 80–83. Leads 80 and 82 are connected to stator windings which receive one phase of the motor drive signal, while leads 81 and 83 are connected to stator windings for the remaining phase of the motor drive signal.

Both the field structure and the mechanical construction of the motor 14 are especially adapted to develop maximum smooth motor driving power for a driven element and a skew of 45° provides particularly good results with the AC current supplied. Although shown with the skew allocated solely to the rotor for diagrammatical illustration, the skew can be divided in any ratio between rotor and stator permitted by convenient winding of the stator.

It will be observed that the circuit components required are small in size to match the miniaturization of the motor, to a diameter approximately that of a half dollar to provide a vest pocket tape recorder yet will deliver peak power where conventional RC oscillators lose as much as 29 db with their phase shift network. It has been found with the invention also that there is less loss the lower the signal when more stages of amplification are present and that a quasi sine wave form is provided of optimum significance to drive the capacitor run motor with a greater efficiency for the same battery power without loss below battery potential through phase shift capacitors which as mentioned, need not be large. The oscillator here can be compacted to a size of a small sewing thimble. Moreover with the higher applied or usable voltage the less the ampere drain on the battery and there being no speed governor switches the induction pick up by a microphone in that small of a case is less than 2 db which can easily be shielded for even less pick up or radiation if desired.

Thus it will be readily apparent to those skilled in the art that the present invention provides an improved control circuit and motor construction for small electrical drive motors which is capable of operating to provide a smooth, efficient, powerful motor drive not normally attainable with miniaturized units. The arrangement and types of components utilized within this invention may be subject to numerous modifications well within the purview of this inventor who intends only to be limited to a liberal interpretation of the specification and the appended claims.

What is claimed is:

1. An improved oscillator control circuit for an AC electric motor comprising power input means to connect said control circuit to a power supply, a transistor having base, emitter, and collector electrodes, said transistor being connected to said power input means, push-pull amplifier means connected to receive and amplify the output signals from the collector electrode of said transistor, output means connected to provide the amplified signals from said amplifier means to said electric motor, and feedback circuit means extending between said output means and the base electrode of said transistor, said feedback circuit means including RC phase shift means to invert the phase of the feedback signal fed to said base electrode and an element of said AC motor whose respective impedance is a function of motor speed, whereby an amplified, inverted feedback signal is directed to said base electrode to drive said oscillator slightly beyond saturation.

2. The improved oscillator control circuit of claim 1 wherein said output means includes capacitor means connected in shunt with said push-pull amplifier means.

3. An improved circuit for energizing and controlling an AC motor connected to the circuit output terminals comprising an electronic oscillator containing:
   (a) an amplifier including a push-pull output stage having output terminals connected to the circuit output terminals, the amplifier having a non-zero output impedance; and
   (b) a feedback network in circuit between the circuit output terminals and the input to the amplifier, the feedback network containing means for causing sustained oscillations of the oscillator at a resonant frequency of a tuned circuit in which at least one reactive element is also an AC motor element whose reactive impedance is a function of motor speed.

4. The improved circuit of claim 3 wherein the tuned circuit comprises a resistance-reactance phase shift network.

5. The improved circuit of claim 3 wherein the AC motor element whose reactive impedance is a function of motor speed is an energized motor winding.

6. An improved, electrically powered prime mover comprising:
   (a) an AC motor; and
   (b) a circuit, having output terminals connected to the AC motor, for energizing and controlling the motor comprising an electronic oscillator containing:
      (i) an amplifier including a push-pull output stage having output terminals connected to the circuit output terminals, the amplifier having a non-zero output impedance; and
      (ii) a feedback network in circuit between the circuit output terminals and the input to the amplifier, the feedback network containing means for causing sustained oscillations of the oscillator at a resonant frequency of a tuned circuit containing an AC motor element whose reactive impedance is a function of motor speed.

References Cited

UNITED STATES PATENTS

| | | | |
|---|---|---|---|
| 2,749,441 | 6/1956 | Kelly | 331—137 |
| 2,814,769 | 11/1957 | Williams | 318—138 X |
| 2,995,690 | 8/1961 | Lemon | 318—341 X |
| 3,083,326 | 3/1963 | Deming | 318—138 |
| 3,111,632 | 11/1963 | Murphy | 318—341 X |
| 3,121,832 | 2/1964 | Haskell | 318—138 |

ORIS L. RADER, *Primary Examiner.*

G. A. FRIEDBERG, G. SIMMONS,
*Assistant Examiners.*